United States Patent
Schoonover

(12) 
(10) Patent No.: US 8,581,427 B2
(45) Date of Patent: Nov. 12, 2013

(54) RETRACTABLE POWER TURBINE AND METHOD THEREOF

(75) Inventor: Larry G. Schoonover, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 288 days.

(21) Appl. No.: 13/159,980

(22) Filed: Jun. 14, 2011

(65) Prior Publication Data

US 2012/0319409 A1    Dec. 20, 2012

(51) Int. Cl.
*F02B 63/04* (2006.01)
*F03G 7/08* (2006.01)
*H02K 7/18* (2006.01)

(52) U.S. Cl.
USPC .......................................................... 290/1 R

(58) Field of Classification Search
USPC ............... 290/1 A, 1 R, 44, 55, 42, 43, 53, 54
See application file for complete search history.

(56) References Cited

U.S. PATENT DOCUMENTS

| | | | |
|---|---|---|---|
| 4,532,614 A | 7/1985 | Peppers | |
| 5,839,508 A | 11/1998 | Tubel et al. | |
| 7,165,608 B2 * | 1/2007 | Schultz et al. | 166/66.5 |
| 7,537,053 B1 | 5/2009 | Hall et al. | |
| 2005/0139393 A1 | 6/2005 | Maurer et al. | |
| 2008/0047753 A1 | 2/2008 | Hall et al. | |

OTHER PUBLICATIONS

Lyons et al. "Downhole Pneumatic Turbine Motor: Testing and Simulation Results," SPE Drilling Engineering, vol. 5, No. 3, Sep. 1990, pp. 239-246. [Summary Only].
Shen et al. "Design of downhole turbine alternator for measurement while drilling and its performance analysis," Acta Petrolei Sinica Jun. 2008. [Abstract Only].

* cited by examiner

*Primary Examiner* — Javaid Nasri
(74) *Attorney, Agent, or Firm* — Cantor Colburn LLP

(57) ABSTRACT

A downhole electrical generating apparatus providing power to downhole electronics. The apparatus includes a tubular having a wall forming a tubular space which receives a flow in a flow direction. A retractable electrical generating apparatus positionable in a first condition facing the flow and in a second condition substantially opening the tubular space. Also included is a method of providing power to downhole electronics.

19 Claims, 5 Drawing Sheets

RETRACTABLE POWER TURBINE AND METHOD THEREOF

BACKGROUND

Methods and apparatus for controlling downhole drilling and completion configurations are growing more complex and there is an ever increasing need for downhole control systems which include downhole computerized modules employing downhole computers for commanding downhole tools such as packers, sliding sleeves, valves, etc. based on input from downhole sensors. It will be appreciated that these control systems utilize downhole devices and circuits that require electrical power. Because of shortcomings associated with providing electricity via a wireline from the surface or via batteries housed in the downhole environment, downhole electric power generators have been suggested for use to provide power for downhole electronics. When turbines are employed as the downhole electric power generator, the turbine blades are provided within the flow path of the borehole, obstructing full bore access so that wireline or other operations cannot be performed, such as entry of completion equipment and other objects into the tubing, downhole of the level of the turbine. Other downhole electric power generators including turbines have been provided on a side of the bore so as not to significantly obstruct the main flow, but require a diversion of flow to move the blades. The diverted flow may not be as powerful as the flow through the main flow and the size of the electric power generator must be smaller to fit on the side of the tubing, both of which inevitably reduce the potential capacity for electric power generation.

BRIEF DESCRIPTION

A downhole electrical generating apparatus providing power to downhole electronics, the apparatus includes a tubular having a wall forming a tubular space which receives a flow in a flow direction; and, a retractable electrical generating apparatus positionable in a first condition facing the flow and in a second condition substantially opening the tubular space.

A method of providing power to downhole electronics, the method includes providing a retractable electrical generating apparatus within a flow passageway of a tubular, the retractable electrical generating apparatus positioned substantially perpendicular to a flow direction in a first condition and producing electricity using the retractable electrical generating apparatus in the first condition; and moving at least a portion of the retractable electrical generating apparatus to a position towards a wall of the tubular and providing a substantially clear borehole in the second condition.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
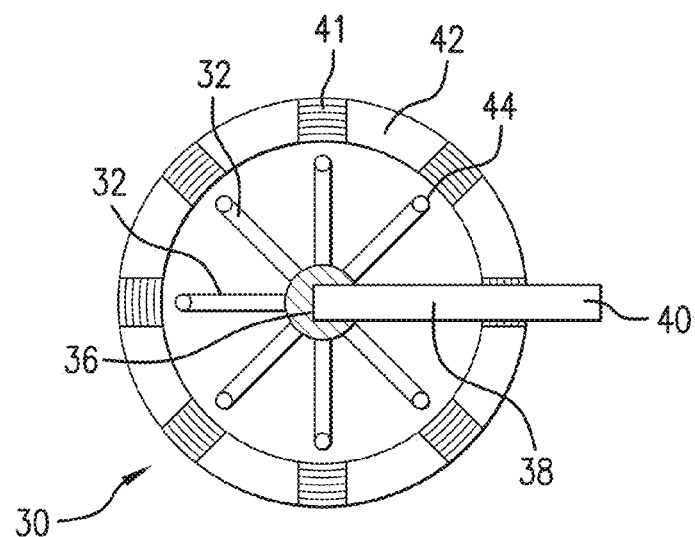
FIG. 1 is a cross-sectional view of an exemplary embodiment of a retractable power turbine apparatus.
Figure 2:
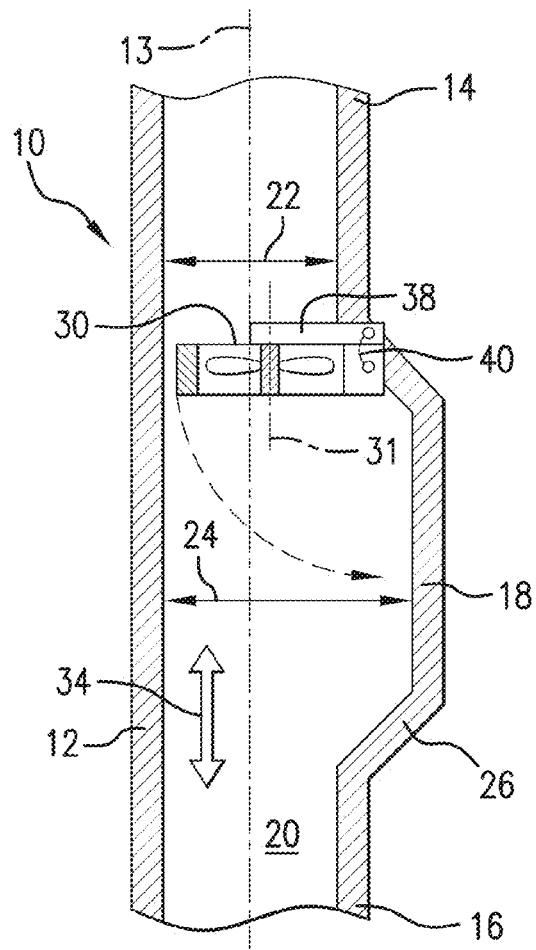
FIG. 2 is a cross-sectional view of the exemplary retractable power turbine apparatus of FIG. 1 within a tubular.

A downhole electrical generating apparatus 10 in accordance with exemplary embodiments is shown in FIGS. 1 and 2 for use in a borehole, such as a production well for producing oil, gas, or the like, for example. Such wells include a well casing, not shown, which may be positioned in the earth, and production tubing, not shown, connected to a tubular 12 of the downhole electrical generating apparatus 10. An uphole section of production tubing is connectable to a first end 14, such as one of an uphole or downhole end of the tubular 12 of the downhole electrical generating apparatus 10, and a downhole section of production tubing is connectable to second end 16, such as the other of an uphole or downhole end of the tubular 12, of the downhole electrical generating apparatus 10. The tubular 12 of the downhole electrical generating apparatus 10 includes a longitudinal axis 13 and a flow passageway that communicates with, and is generally in alignment with, uphole and downhole sections of production tubing. The tubular 12 includes a wall 18 providing a tubular space 20 for the flow passageway that has a first inner diameter 22, substantially the same as a diameter of at least the connecting portions of the upper and lower sections of production tubing, for connecting therewith. The tubular space 20 also has a second inner diameter 24, larger than the first inner diameter 22, for providing a wall pocket 26 or side pocket that receives a retractable power turbine 30 of the downhole electrical generating apparatus 10 when a full bore is required in the production tubing and tubular 12 so that wireline or other operations can be performed downhole of the level of the retractable power turbine 30. The longitudinal section of the tubular 12 that includes the wall pocket 26 may have different widths depending on the cross-section taken along the section.

With further reference to FIGS. 1 and 2, the retractable power turbine 30 of the downhole electrical generating apparatus 10 includes turbine blades 32, which are positioned, in a first condition, within the flow 34 of the flow passageway in the tubular space 20. The turbine 30 may have a smaller diameter than the first diameter 22 of the tubular 12. The turbine 30 may be less than half of the first diameter 22, but may be larger, as long as it is sized to fit within the wall pocket 26 in the second condition of the turbine 30. That is, the turbine 30 folds down into the wall pocket 26 in the side of the tubular 12 in the second condition and substantially out of the flow 34. The wall pocket 26 forms an upset on the outside of the tubular 12 which provides the necessary wall thickness and second diameter 24 to substantially remove the turbine 30 from the flow 34 in the second condition. Thus, the turbine 30 is provided substantially perpendicular to the direction of flow 34 in the first condition, and substantially parallel to the direction of flow 34 in the second condition.

During a production operation, production fluid flowing upwardly through the production tubing and the tubular 12 (or during injection operation, fluid flowing downwardly through the tubing) will rotate the turbine blades 32 when the turbine 30 is positioned in the first condition within the flow 34. The blades 32 are connected to a center bearing 36, and the turbine blades 32 rotate around the center bearing 36 and around rotation axis 31 of the turbine 30 due to the force of fluid in the flow 34 pushing past the blades 32. The center bearing 36 is supported by a support rod 38 connected to the tubular wall 18 by a pivot 40. The support rod 38 folds with the turbine 30 into the wall pocket 26. Surrounding the turbine blades 32 is a sealed unit 42, which contains coils 41 for a generator. The blades 32 are provided with magnets 44 at ends thereof that interact with the coils 41 of the sealed unit 42 when the blades 32 are rotated. That is, the movement of the magnets 44 near the coils 41 creates a flow of electrons, which can be harnessed into electricity in a known manner. The turbine 30, including the coils 41 within the sealed unit 42, the turbine blades 32 having the magnets 44, the bearing 36, and the support rod 38, all move together from the first condition within the flow 34 for electricity production to the second condition substantially out of the flow 34 for providing a clear borehole. The movement from the first condition to the second condition, and from the second condition to the first condition, may be performed by a pushing or pulling force from a downhole tool inserted through the tubular 12 and physically engaging the turbine 30, or alternatively by remote actuation.

While a coil containing sealed unit 42 has been disclosed as surrounding the turbine blades 32 of the turbine 30 of the downhole electrical generating apparatus 10, it would also be within the scope of these embodiments to utilize the central bearing 36 as a rotor by connecting the central bearing 36 to a generator positioned outside of the flow 34, such as within the wall pocket 26 or a separate upset within the wall 18. Rotation of the bearing 36 may provide the necessary rotation for the generation of electricity in a generator. In such an embodiment, the central bearing 36 may transmit rotational energy via the support rod 38 to the generator.

Also, in yet another exemplary embodiment, instead of providing the coil containing sealed unit 42 as part of the retractable portion that is folded into the wall pocket 26, the coils may remain fixed around or inside a circumference of the wall 18, similar to coil containing unit 126 as will be further described below with respect to FIG. 3. In such an embodiment, the turbine blades 32 and the magnets 44 spin in the flow 34 in the first condition, and are retractable together into the wall pocket 26 in the second condition, but the coils remain fixed around the circumference of the wall 18 in both conditions. Also in such an embodiment, the support rod 38 may be positioned such that the turbine blades 32 are pulled into the wall pocket 26, that is, the support rod 38 may be connected to an opposite side of the central bearing 36, such as a downhole side of the central bearing 36 instead of an uphole side of the central bearing 36, so that the support rod 38 does not interfere with the coils when the turbine is in the first condition.

Figure 3:
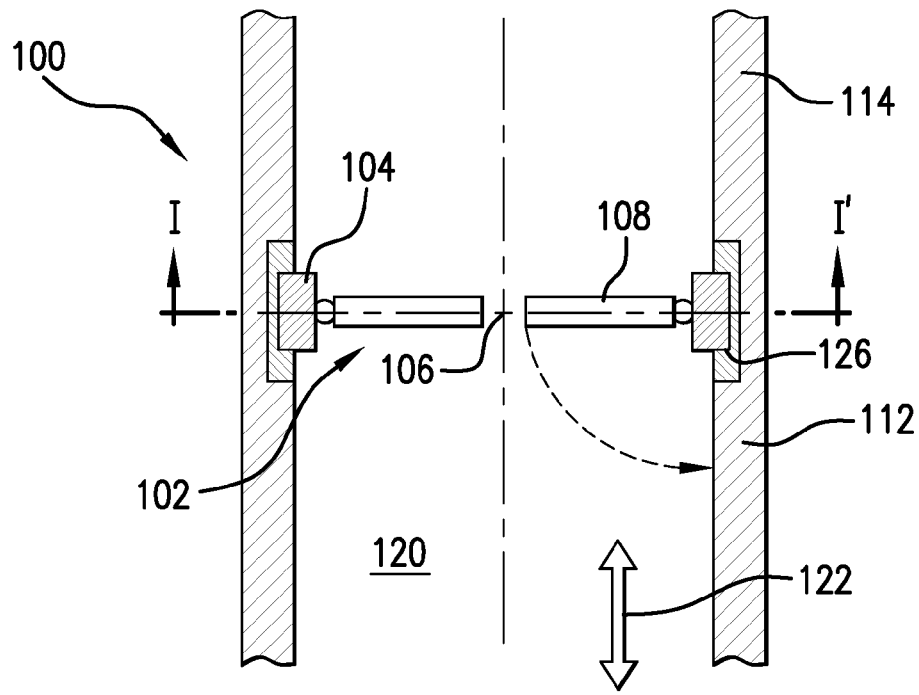
FIG. 3 is a cross-sectional view of another exemplary embodiment of a retractable power turbine apparatus within a tubular.
Figure 4:
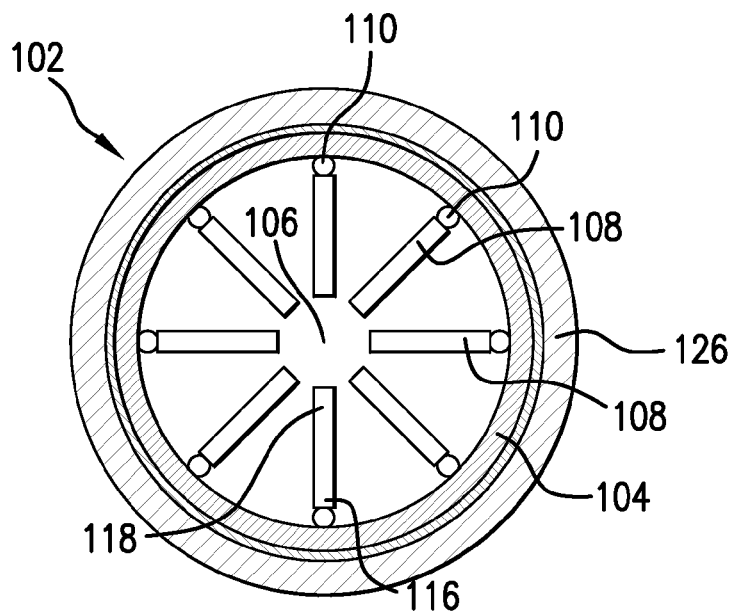
FIG. 4 is a cross-sectional view taken along line I-I' of FIG. 3.

Turning now to FIGS. 3 and 4, in another exemplary embodiment, a downhole electrical generating apparatus 100 includes a turbine 102 that rotates on an annular bearing 104 with no support in the center 106. In such an embodiment, the blades 108 of the turbine 102 are mounted on pivot or swivel attachment 110 along the annular bearing 104 and can rotate back to the wall 112 of a tubular 114 housing the turbine 102 to provide a clear path. The blades 108 include a first end 116 pivotally attached, such as by but not limited to a swivel attachment 110, the annular bearing 104 and a second end 118 closer to a central area 106 of the tubular space 120 within the tubular 114. In a first condition, the blades 108 are extended so as to be substantially perpendicular to the direction of the flow 122, so that the force of the flow 122 rotates the blades 108 about the annular bearing 104. In a second condition, to substantially remove the blades 108 from the flow passageway through the tubular space 120, the blades 108 may be pivoted downwardly so as to lie substantially flush with the wall 112 of the tubular 114 and parallel with a direction of the flow 122. For electricity production, the turbine 102 may be surrounded by a coil containing unit 126, as in the first embodiment, where magnets may be provided in the annular bearing 104 and/or ends 116 of the turbine blades 108. As in the first embodiment, actuation from the first condition to the second condition may occur using a downhole tool or via remote actuation. While the annular bearing 104 and sealed unit 126 are shown embedded within the wall 114 of the tubular 112, it would also be within the scope of these embodiments to form upsets within the wall 114 or other supporting structures about the wall 114 to support the annular bearing 104 and/or the sealed unit 126.

Figure 5:
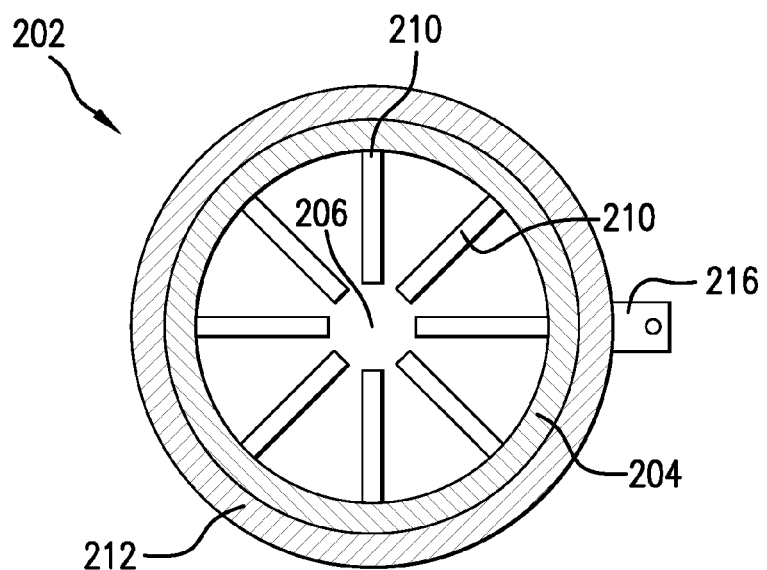
FIG. 5 is a cross-sectional view of yet another exemplary embodiment of a retractable power turbine apparatus.
Figure 6:
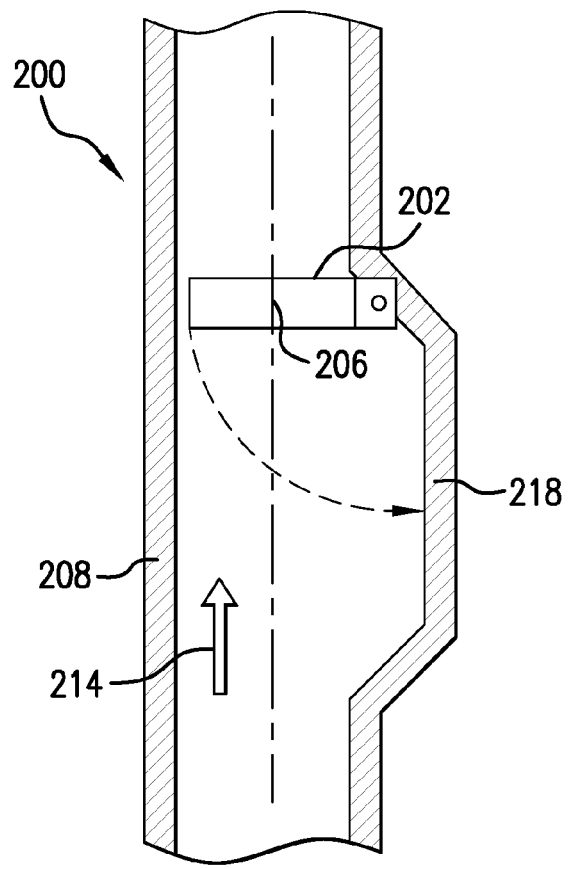
FIG. 6 is a cross-sectional view of the exemplary retractable power turbine apparatus of FIG. 5 within a tubular.
Figure 7:
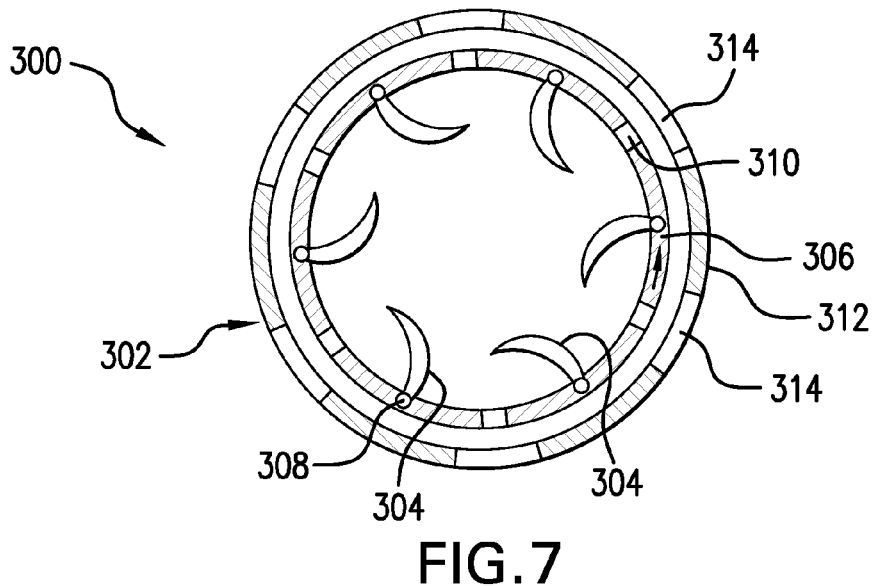
FIG. 7 is a cross-sectional view of still another exemplary embodiment of a retractable power turbine apparatus.

Turning now to FIGS. 5 and 6, in yet another exemplary embodiment, a downhole electrical generating apparatus 200 includes a turbine 202 that rotates on an annular bearing 204 with no support in the center 206, similar to the turbine 102 shown in FIGS. 3 and 4. Unlike the turbine 102 shown in FIGS. 3 and 4, the turbine 202 is pivotally connected to tubular 208, as is the turbine 30 shown in FIGS. 1 and 2. Thus, the downhole electrical generating apparatus 200 includes a combination of features shown in the previous embodiments, and additional details and alternatives of the downhole electrical generating apparatus 200 may be derived from a review of the detailed descriptions of those embodiments. With reference again to FIGS. 5 and 6, the turbine 202 includes turbine blades 210 connected to the annular bearing 204 which may be rotatably supported within a sealed unit 212 for electricity production in a first condition when a flow 214 of fluid pushes past the turbine blades 210 causing rotation thereof. The turbine 202 is pivotally connected, such as by using a support rod 216 to the tubular 208 to fold the turbine 202 into wall pocket 218 in a second condition to provide a substantially clear borehole within the tubular 208.

Figure 8A:
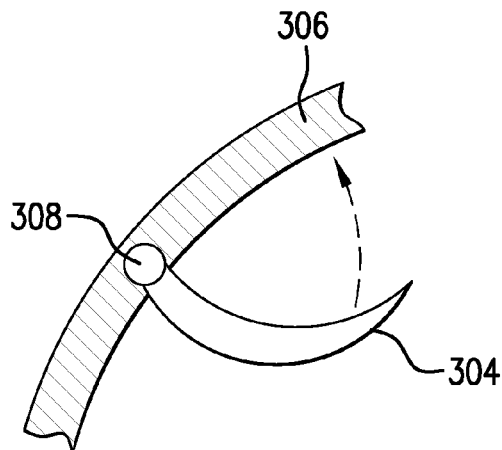
FIGS. 8A and 8B are partial cross-sectional views of an exemplary turbine blade of FIG. 7 in extended and retracted positions, respectively.
Figure 8B:
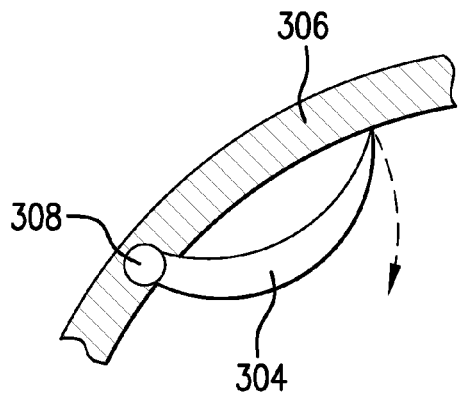
Figure 9:
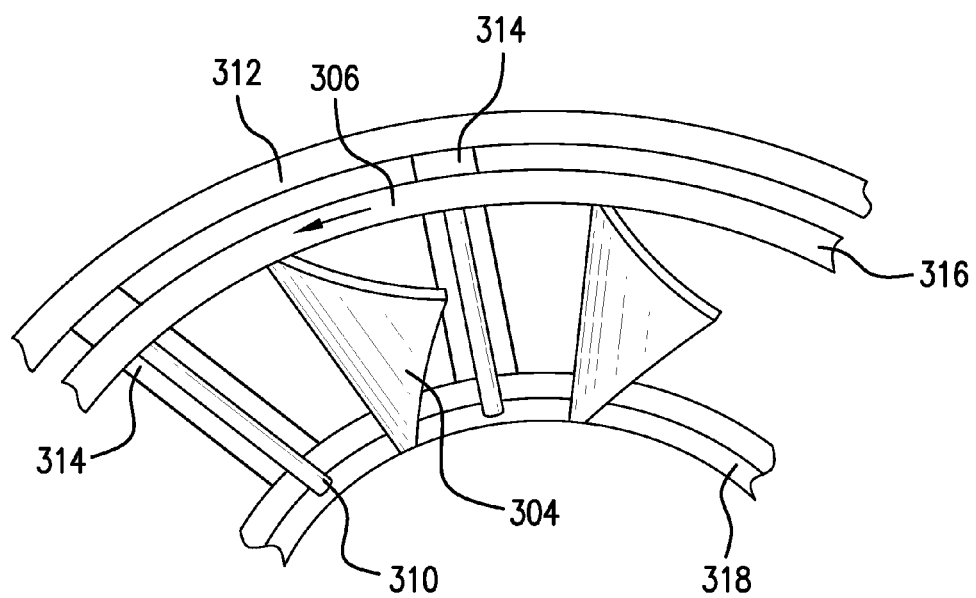
FIG. 9 is a partial perspective view of the retractable turbine apparatus of FIG. 7.

With reference to FIGS. 7, 8A-8B, and 9, in still another exemplary embodiment, a downhole electrical generating apparatus 300 includes a turbine 302 that rotates on an annular bearing with no support in the center, similar to the previously described turbines 102 and 202. Unlike the turbines 102 and 202, however, the turbine blades 304 swivel sideways towards the wall of the tubular in the second condition instead of swiveling towards the wall in a downhole or uphole direction. The blades 304 are mounted on a rotor 306 on a swivel or pivot 308. Magnets 310 are also positioned on the rotor 306. When the flow through the tubular causes the blades 304 to spin, the rotor 306 spins relative to a coil-containing stator 312 containing coils 314, where the stator 312 may be positioned in the tubular, as in the embodiment shown in FIG. 3. FIG. 8A shows the turbine blade 304 extended in the first condition within the flow for rotating the rotor 306 relative to the stator 312. FIG. 8B show the turbine blade 304 retracted in the second condition, substantially out of the flow, or at least substantially out of the central region of the tubular, to provide a substantially clear borehole in the second condition. As shown in FIG. 9, the blade 304 is pivotally connected to an uphole end 316 and a downhole end 318 of the rotor 306. In an exemplary embodiment, a magnet 310 is extended between the uphole end 316 and the downhole end 318 of the rotor 306, and between each adjacent pair of blades 304. Alternatively, each turbine blade 304 may include a magnet at each rotor side end thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material or blade shape to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A downhole electrical generating apparatus comprising:
a tubular having a wall forming a tubular space configured to receive fluid flow in a flow direction; and,
a retractable turbine having turbine blades rotatable around a rotation axis of the turbine, the turbine positionable in a first condition facing the flow with the rotation axis of the turbine substantially parallel to the flow direction and substantially parallel to a longitudinal axis of the tubular, the blades rotated by the flow when the turbine is in the first condition, and the blades positionable in a second condition substantially opening the tubular space.

2. The downhole electrical generating apparatus of claim 1, wherein, in the first condition, at least a portion of the retractable turbine is positioned substantially perpendicular to the flow direction, and positioned substantially parallel to the flow direction in the second condition.

3. The downhole electrical generating apparatus of claim 1, wherein the wall includes a wall pocket protruding therefrom, and the retractable turbine is positioned within the wall pocket in the second condition.

4. The downhole electrical generating apparatus of claim 1, wherein at least a portion of the retractable turbine is pivotable from the first condition to the second condition.

5. The downhole electrical generating apparatus of claim 1, wherein the turbine includes a central bearing at the rotation axis of the turbine, the blades rotatable around the central bearing, and further comprising a support rod connecting the central bearing to the wall.

6. The downhole electrical generating apparatus of claim 5, wherein the support rod is pivotably attached to the wall.

7. The downhole electrical generating apparatus of claim 6, wherein the support rod is pivotably attached to the wall adjacent a wall pocket to swing the turbine from the first condition within the flow to the second condition within the wall pocket and substantially out of the flow.

8. The downhole electrical generating apparatus of claim 1, wherein the turbine includes a sealed unit containing coils for a generator.

9. The downhole electrical generating apparatus of claim 8, wherein the turbine blades have magnets on ends thereof.

10. The downhole electrical generating apparatus of claim 1, wherein the turbine includes turbine blades mounted along an annular bearing.

11. The downhole electrical generating apparatus of claim 10, wherein the turbine blades are retractable from the first condition to the second condition.

12. The downhole electrical generating apparatus of claim 11, wherein the annular bearing is mounted within the wall and substantially shares a longitudinal axis with the tubular.

13. The downhole electrical generating apparatus of claim 11, wherein the turbine blades are mounted on swivels along the annular bearing and are moveable from the first condition positioned within the flow to the second condition adjacent the wall.

14. The downhole electrical generating apparatus of claim 10, further comprising a coil containing unit surrounding the annular bearing.

15. The downhole electrical generating apparatus of claim 10, wherein the turbine, including the turbine blades and the annular bearing, are pivotally connected as a unit to the tubular adjacent a wall pocket to swing the turbine from the first condition within the flow to the second condition within the wall pocket and substantially out of the flow.

16. A method of generating electricity in a downhole environment, the method comprising:
providing a retractable turbine having turbine blades rotatable around a rotation axis of the turbine within a flow passageway for fluid flow through a tubular;
positioning the retractable turbine substantially perpendicular to a flow direction of the fluid flow in a first condition, and positioning the rotation axis of the turbine substantially parallel to a longitudinal axis of the tubular and substantially parallel to the flow direction in the first condition;
producing electricity using the retractable turbine in the first condition by rotating the blades with the fluid flow; and
moving at least a portion of the retractable turbine to a position towards a wall of the tubular and providing a substantially clear borehole in a second condition.

17. The method of claim 16, wherein moving at least a portion of the retractable turbine includes pivoting the retractable turbine into a wall pocket of the tubular.

18. The method of claim 16, wherein providing the retractable turbine includes providing the turbine within a coil containing sealed unit.

19. The method of claim 16, wherein moving at least a portion of the retractable turbine includes pivoting the turbine blades towards a wall of the tubular.

* * * * *